United States Patent [19]
Padwekar

[11] Patent Number: 5,897,665
[45] Date of Patent: *Apr. 27, 1999

[54] REGISTER ADDRESSING FOR REGISTER-REGISTER ARCHITECTURES USED FOR MICROPROCESSORS AND MICROCONTROLLERS

[75] Inventor: Kiran A. Padwekar, Santa Clara, Calif.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/573,482

[22] Filed: Dec. 15, 1995

[51] Int. Cl.$^6$ .............................. G06F 12/04; G06F 12/10
[52] U.S. Cl. ..................... 711/212; 711/220; 711/167; 711/202; 395/376; 395/183.11
[58] Field of Search .............................. 395/421.02, 375, 395/800, 183.11, 494, 421.1, 376; 711/202, 212, 220

[56] References Cited

U.S. PATENT DOCUMENTS

| | | | |
|---|---|---|---|
| 4,980,819 | 12/1990 | Cushing et al. ...................... | 395/375 |
| 5,239,639 | 8/1993 | Fischer et al. ........................ | 395/494 |
| 5,243,601 | 9/1993 | Tague et al. ......................... | 395/183.11 |
| 5,507,000 | 4/1996 | Stewart et al. ....................... | 395/800 |
| 5,539,911 | 7/1996 | Nguyen et al. ...................... | 395/800 |

*Primary Examiner*—David K. Moore
*Assistant Examiner*—Than V. Nguyen
*Attorney, Agent, or Firm*—Blakely, Sokoloff, Taylor & Zafman LLP.

[57] ABSTRACT

A microprocessor or microcontroller architecture which utilizes a 64 byte-register file in a unique manner. The lowest 16 bytes of the register file can be accessed as 16 8-bit registers (R0–R15), the lowest 32 bytes can also be accessed as 16 32-bit (word) registers (WR0–WR30), and the entire register file can be accessed as 16 64-bit (double word or Dword) registers (DR0–DR60). In this manner, various combinations of 8/16/32-bit registers are provided without wasting the register file. While providing at least 16 8/16/32-bit registers, only four bits are necessary to encode a register, thereby allowing two byte register-to-register instructions. The register file and an instruction sequencer operate to provide the 64 byte-register file which can be accessed so that the lowest 16 bytes of the register file are accessed as 16 8-bit registers (R0–R15), the lowest 32 are accessed as 16 word registers (WR0–WR30), and the entire register file is accessed as 16 double word registers (DR0–DR60).

12 Claims, 5 Drawing Sheets

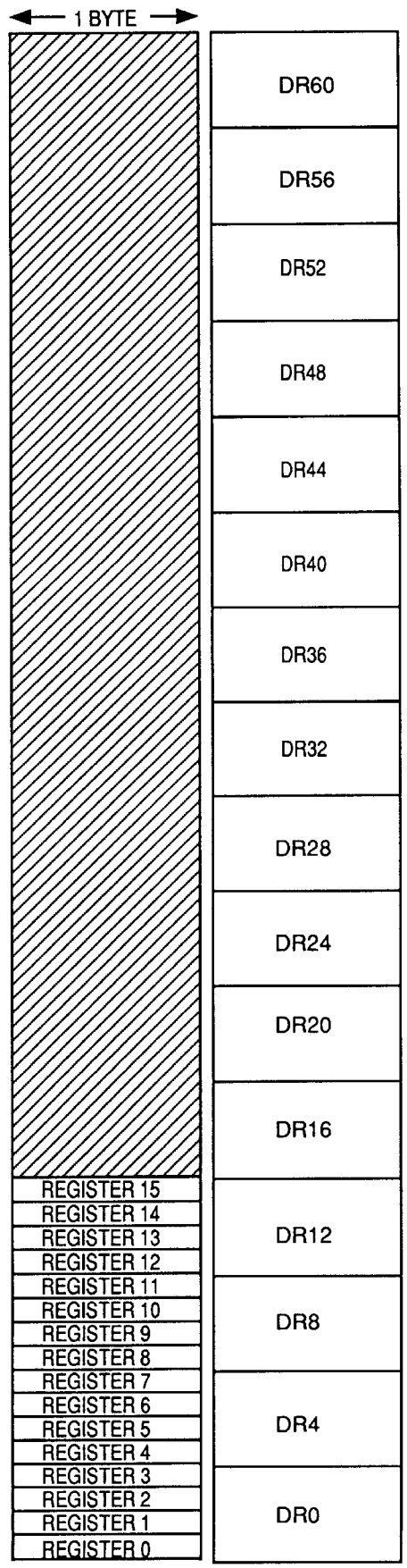
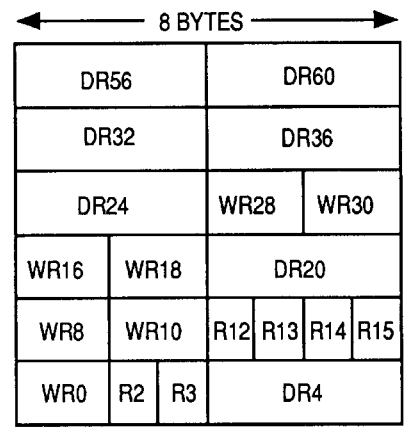
FIG. 2b
FIG. 2a

| QR200 | | | | | | | |
|---|---|---|---|---|---|---|---|
| ⋮ | | | | | | | |
| QR184 | | | | | | | |
| QR176 | | | | | | | |
| QR168 | | | | | | | |
| QR160 | | | | | | | |
| QR152 | | | | | | | |
| QR144 | | | | | | | |
| QR136 | | | | | | | |
| QR128 | | | | | | | |
| DR120 | | | | DR124 | | | |
| DR112 | | | | DR116 | | | |
|  | | | |  | | | |
|  | | | |  | | | |
|  | | | |  | | | |
|  | | | |  | | | |
| DR72 | | | | DR76 | | | |
| DR64 | | | | DR68 | | | |
| WR56 | | WR58 | | WR60 | | WR62 | |
| WR48 | | | | | | WR54 | |
| WR40 | | | | | | WR46 | |
| WR32 | | WR34 | | WR36 | | WR38 | |
| R24 | R25 | | | | | R30 | R31 |
| R16 | | | | | | | R23 |
| R8 | | | | | | | R15 |
| R0 | R1 | R2 | R3 | R4 | R5 | R6 | R7 |

REGISTER ADDRESSING FOR REGISTER-REGISTER ARCHITECTURES USED FOR MICROPROCESSORS AND MICROCONTROLLERS

FIELD OF THE INVENTION

The invention is in the area of microcontroller or microprocessor Register—Register architectures. It improves the utilization of the register file of a microcontroller, and therefore reduces the cost of implementing the register file. It also reduces the instruction length for register—register instructions resulting in smaller code size and faster execution.

BACKGROUND OF THE INVENTION

There are currently two approaches to register files used in microcontrollers and microprocessors. One of the approaches allows aligned accesses to bytes, words and double words (Dwords) for the entire register file. This approach requires more bits to encode register addresses, resulting in longer instructions and larger code. For example a register file of 64 bytes requires 6 bits to encode each of the 64 8-bit register references. Therefore, an instruction with two register references take 12 bits to encode the two register addresses. With an instruction length of two bytes, only four bits remain for opcode encoding which cuts down the number of possible instructions substantially. Using an instruction length of three bytes increases the code size and requires higher bus bandwidth.

The other approach is taken by many RISC architectures. These architectures have multiple (typically 32) 32-bit registers (128 bytes in total), each of which can also be used as 16 and 8-bit registers. This approach reduces the utilization of the register file. If, for example, a register is used as an 8-bit register, the remaining three bytes of the 32-bit register cannot be utilized. This results in requiring more registers for efficient compiler implementation, which in turn results in longer instructions to encode register addresses (commonly 32-bit) and lower code density. This approach is suited for architectures where performance is of highest importance and cost is of secondary importance.

SUMMARY OF THE INVENTION

In the present invention, an architecture is utilized which utilizes, in one embodiment, a 64 byte-register file in a unique manner. The lowest 16 bytes of the register file can be accessed as 16 8-bit registers (R0–R15), the lowest 32 bytes can also be accessed as 16 32-bit (word) registers (WR0–WR30), and the entire register file can be accessed as 16 64-bit (double word or Dword) registers (DR0–DR60).

The invention has equal application to register files of any size, i.e., registers of any length and for any number of registers. For example, the register file could be 256-bytes with 32 registers of length 8-bits, 16-bits, 32-bits and 64-bits each. The lowest 32 bytes of such register-file would be accessible as a 32 8-bit registers (R0–R31), the lowest 64 bytes would also be accessible as 32 16-bit registers (WR0–WR62), lowest 128 bytes would be accessible as 32 32-bit registers (DR0–DR124), and the entire 256 byte register file would be addressable as 32 64-bit registers (QR0–QR248).

This scheme has the following advantages:

1. It provides various combinations of 8/16/32-bit registers without wasting the register file. For example, it is possible to have 16 8-bit registers, and 8 each of 16 and 32-bit registers for a total of 32 registers in a 64-byte register file. This is particularly suited for 8-bit microcontroller architectures where the predominant use would be 8-bit data and a few 16 and 32-bit address/data registers.

2. Compiler technology requires 16 to 32 registers for efficient implementation. Any less is inadequate, and any more has diminishing returns. The invented register file architecture provides at least 16 8/16/32-bit registers. If any 8 or 16-bit registers are not used, more than 16 registers are available, upto a maximum of 32 registers as indicated above. Yet only four bits are necessary to encode a register, thereby allowing two byte register-to-register instructions. This increases the code density and the pipeline throughput since the instructions are shorter than those of a typical RISC architecture. Thus, this choice provides the advantages of a RISC architecture while avoiding the disadvantages, and is well suited for cost effective implementation of compilers.

3. A compact register file also has lower silicon cost, faster access time and, therefore, can be run at a higher frequency, thereby improving the performance of the CPU further.

4. This registerfile also allows registers of different length to be used interchangeably. For example, strings can be moved to and from memory as Dwords, but operated upon as bytes in portions of register files that are addressable both as 8-bit and 32-bit registers.

BRIEF DESCRIPTION OF THE DRAWINGS

FIG. 2a shows the relationship between byte registers, word registers and double word registers in a register file according to the present invention.

FIG. 2b shows an example of how the register file may be arranged for a typical mixed usage of byte registers, word registers and double word registers.

FIG. 2c shows an example of how the register file may be arranged for a typical mixed usage of byte registers, word registers, double word registers and quadruple word registers.

DETAILED DESCRIPTION OF THE INVENTION

Figure 1:
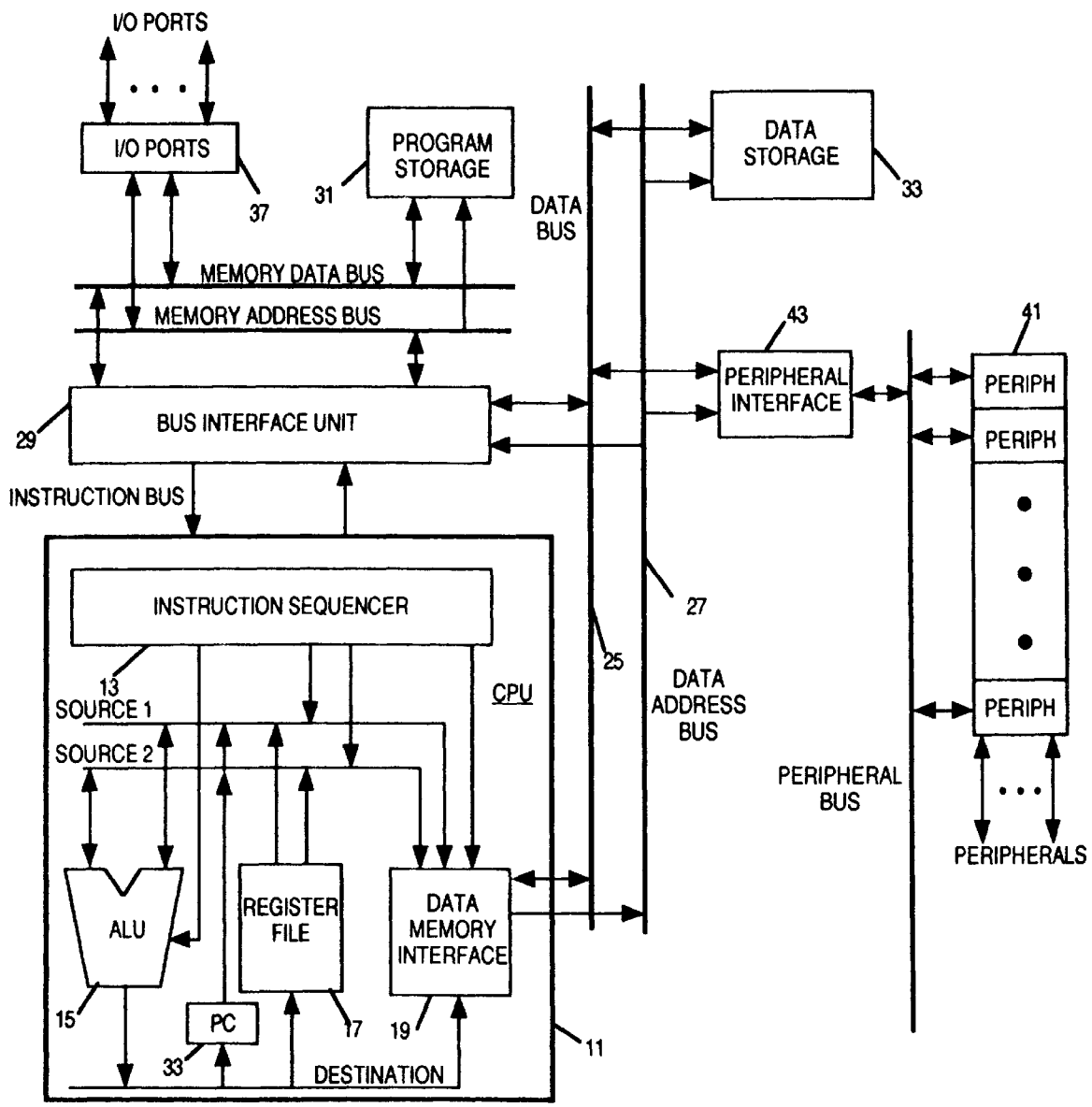
FIG. 1 is a block diagram showing the architecture of a suitable microcontroller which may utilize the invented register file technique.

Referring to FIG. 1, the functional blocks of an architecture of a suitable microcontroller which may utilize the invented register file accessing technique are shown. Although a typical microcontroller may include additional functional blocks, the functional blocks shown in FIG. 1 are sufficient for explaining how to make and use the present invention. Additionally, persons skilled in the field of the invention will recognize that numerous timing, control and power signals are needed, however, the specifics of such additional signals are highly dependent on the specifics of the microcontroller implementation and are not needed for a proper understanding of the present invention.

The microcontroller shown in FIG. 1 includes a central processing unit CPU 11 having an instruction sequencer 13, ALU 15, register file 17, data memory interface 19, program counter (PC) 23, source bus 1, source bus 2 and destination bus. The CPU communicates with the other elements of the microcontroller using a data bus 25, data address bus 27 and bus interface unit 29. Bus interface unit 29 feeds instructions to instruction sequencer 13 over an instruction bus. Program storage 31 which is typically, but not always, a read only memory (ROM) is used to contain a user program which controls the operation of the microcontroller and connects to the CPU over a memory data bus and memory address bus through bus interface unit 27. Data storage 33, which is typically a random access memory (RAM), contains data used by the program in program storage 31 as it is run in CPU 11. The microcontroller communicates with the outside world using I/O ports 37 which are coupled to the memory data bus and memory address bus and peripherals 41 which are coupled to a peripheral bus and to the data bus and data address bus through peripheral interface 43. User programs may also be stored in external memories coupled to the microcontroller through I/O ports 37. Data used by running programs may also come from or be sent to peripherals 41.

The CPU accesses code and data through two different buses. Bus interface unit 29 feeds the instruction bus with code from program storage 31 or external memory, both connected to the memory bus. Internal data access is either to/from register file 17 or through the data bus which is connected to data storage 33, peripheral interface 43 and bus interface unit 29. Data accesses to peripherals connected to the peripheral bus is facilitated by peripheral interface unit 43, while accesses to peripherals through I/O ports 37 are facilitated by the bus interface unit. The bus interface unit also transfers data between the memory bus and the data bus.

The present invention lies mainly in the implementation of register file 17 and instruction sequencer 13 and is directed to a microcontroller architecture which provides a 64 byte-register file which can be accessed so that the lowest 16 bytes of the register file are accessed as 16 8-bit registers (R0–R15), the lowest 32 are accessed as 16 word registers (WR0–WR30), and the entire register file is accessed as 16 double word registers (DR0–DR60).

FIG. 2a shows the mapping of the various registers within a 64 byte space. As shown, R0–R15 are the first 16 bytes in the register file which also correspond to WR0–WR14 and DR0–DR12. WR16–WR30 and DR16–DR28 are the second 16 bytes of the register file. DR32–DR60 are the last 32 bytes of the register file. R16–R63 theoretically exist, but to access these registers at the byte level would require 5 bits in the instruction for R16–R31 and 6 bits for R32–R63. Similarly, WR32–WR62 theoretically exist, but would require 5 bits at the instruction level to access.

FIG. 2b shows one example of how the register file may be addressed as byte, word and double word registers. FIG. 2c shows one example of how the register file may be addressed as byte, word, double word and quadruple word registers.

The encoding/decoding of the register file provides for the capability of addressing up to 16 byte registers, 16 word registers and 16 double word registers. Although the register file is 64 bytes, which normally would require 6 bits to address (i.e., $2^6$=64), the registers can be addressed with a 4 bit encoding shown in Table I.

TABLE I

| Register Encoding | Byte Register | Word Register | DoubleWord Register |
|---|---|---|---|
| 0000 | R0 | WR0 | DR0 |
| 0001 | R1 | WR2 | DR4 |
| 0010 | R2 | WR4 | DR8 |
| 0011 | R3 | WR6 | DR12 |
| 0100 | R4 | WR8 | DR16 |
| 0101 | R5 | WR10 | DR20 |
| 0110 | R6 | WR12 | DR24 |
| 0111 | R7 | WR14 | DR28 |
| 1000 | R8 | WR16 | DR32 |
| 1001 | R9 | WR18 | DR36 |
| 1010 | R10 | WR20 | DR40 |
| 1011 | R11 | WR22 | DR44 |
| 1100 | R12 | WR24 | DR48 |
| 1101 | R13 | WR26 | DR52 |
| 1110 | R14 | WR28 | DR56 |
| 1111 | R25 | WR32 | DR60 |

Of course, at the hardware level, a 6-bit address is needed to address any register within the 64 byte register file. However, the necessary translation from the 4 bit address in the instruction being executed can be done in instruction sequencer 13 according to the context of the instruction being executed. The micro-code generated by instruction sequencer 13 provides information about the context of the register operand being accessed (i.e., whether it is being accessed as a byte, word or double word). This information is used by the instruction sequencer to form a full 6-bit address. For word and double word operands only the base address of the register, which will be word or double word aligned respectively, is required. Subsequent micro instructions will sequence through the other bytes of the operand as necessary by incrementing the original base address. A flow diagram showing a high level picture of the logic flow in the instruction sequencer that translates the 4-bit address to a 6-bit address is shown in FIG. 3.

Figure 3:
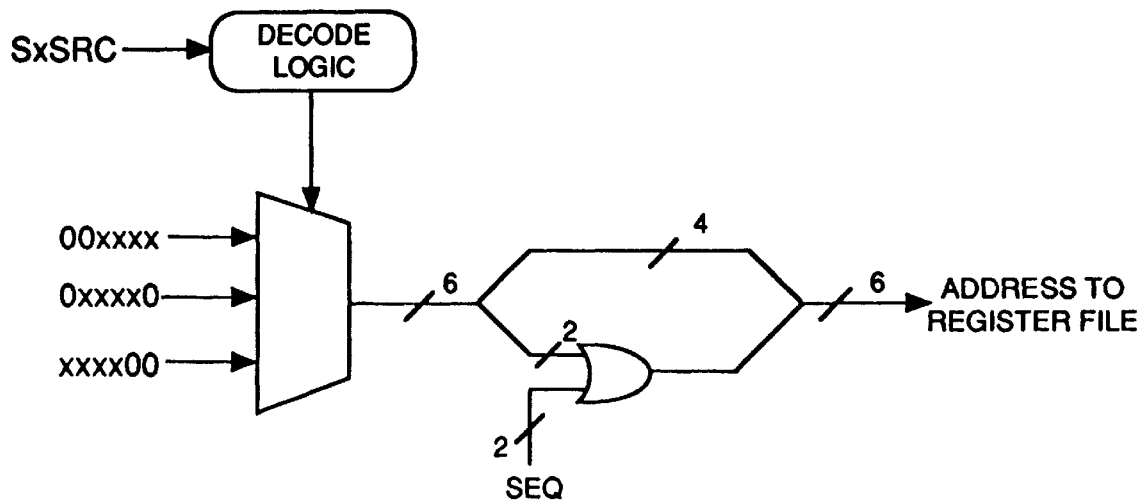
FIG. 3 shows the flow used by the instruction sequencer to produce an address to access the register file.

Referring to FIG. 3, multiplexor 51 has three inputs which are the 4-bit register encoding from the instruction being executed with a leading 00 for accesses to R0–R15, a leading 0 and ending 0 for WR0–WR32 and an ending 00 for DR0–DR60. OR gate 53 has two inputs, one being the least significant two bits from the six bits output from multiplexor 51 and the other being a two bit value SEQ generated by instruction sequencer 13 for word and double word operations. The microcode is used by decode logic 55 to select a 6 bit base address from the inputs to multiplexor 51 which are formed by concatenating 0s with the 4-bit register address from the instruction as follows: for byte register instructions precede the 4-bit register address with two 0s, for word register instructions precede the 4-bit register address with one 0 and end the 4-bit register address with one 0, for double word register instructions, end the 4-bit register address with two 0s. The appropriate individual byte register within the 64 byte register file is addressed by the 6-bit register address which is generated by Oring two SEQ bits from the microinstruction with the two low order bits of the 6-bit base address. The SEQ bits select the byte register within the chosen byte, word or Dword register about to be read or written during the current clock cycle. That is, for byte register addresses, SEQ is 00. For word register addresses, SEQ is 00 for the first register addressed and 01 for the second register. For Dword address, SEQ is 00 for the first register, 01 for the second register, 10 for the third register and 11 for the fourth register. This is illustrated in Table II.

TABLE II

| Register | xxxx | SEQ |
|---|---|---|
| R4 | 0100 | 00 |
| WR2 | 0001 | 00 |
| WR3 | 0001 | 01 |
| DR20 | 0101 | 00 |
| DR21 | 0101 | 01 |
| DR22 | 0101 | 10 |
| DR23 | 0101 | 11 |

Thus, for an access to R0–R15, the six bit address sent to the register file is 00xxxx$_2$, where xxxx are the four bits from the instruction being executed representing the byte register being accessed, since OR gate 53 simply passes the two least significant bits from multiplexor 51 which are then recombined with the four bits most significant bits from multiplexor 51.

For accesses to WR0–WR16 and DR0–DR60, the 6 bit addresses input to multiplexor 51 are as follows:

TABLE III

| WR0 | 000000 | DR0 | 000000 |
|---|---|---|---|
| WR2 | 000010 | DR4 | 000100 |
| WR4 | 000100 | DR8 | 001000 |
| WR6 | 000110 | DR12 | 001100 |
| WR8 | 001000 | DR16 | 010000 |
| WR10 | 001010 | DR20 | 010100 |
| WR12 | 001100 | DR24 | 011000 |
| WR14 | 001110 | DR28 | 011100 |
| WR16 | 010000 | DR32 | 100000 |
| WR18 | 010010 | DR36 | 100100 |
| WR20 | 010100 | DR40 | 101000 |
| WR22 | 010110 | DR44 | 101100 |
| WR24 | 011000 | DR48 | 110000 |
| WR26 | 011010 | DR52 | 110100 |
| WR28 | 011100 | DR56 | 111000 |
| WR32 | 011110 | DR60 | 111100 |

Thus, for WR2, WR6, WR10, WR14, WR18, WR22, WR26 and WR32 the least significant two bits output from multiplexor 51 are 10$_2$ and for WR0, WR4, WR8, WR12, WR16, WR20, WR24 and WR28 the least significant two bits output from multiplexor 51 are 00$_2$. For DR0–DR60, the least significant two bits output from multiplexor 51 are 00$_2$.

Figure 4:
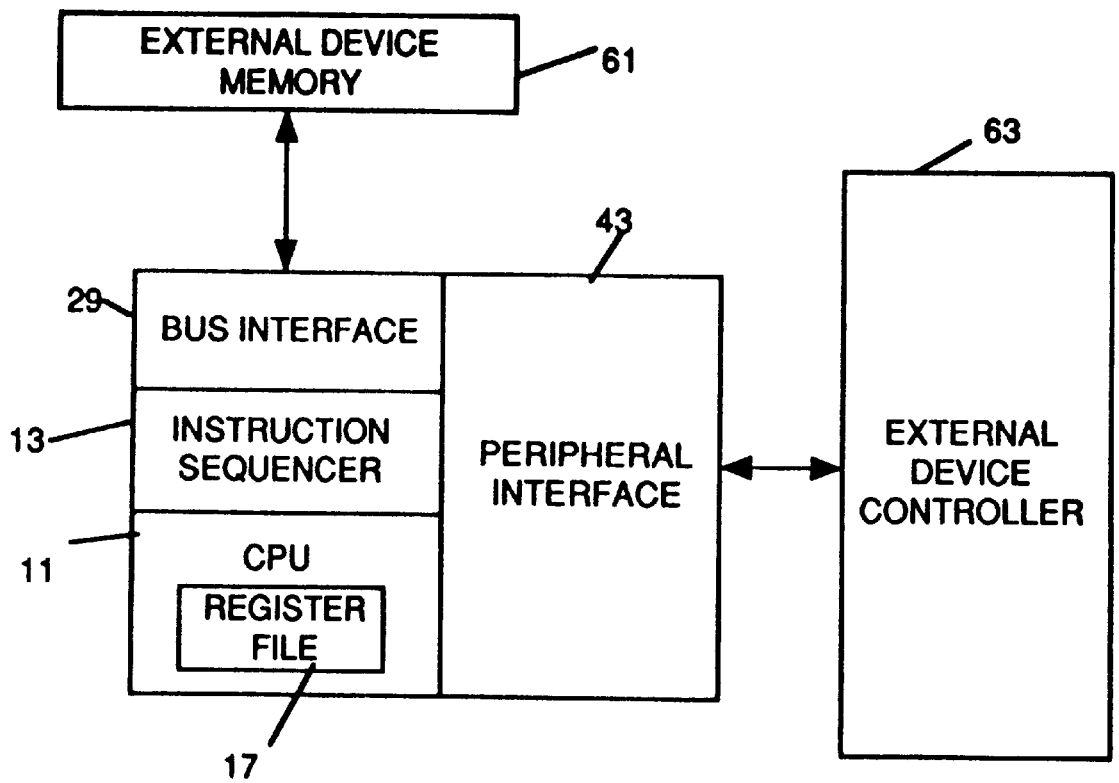
FIG. 4 shows a system in which a microcontroller incorporating the invented register file may be used.

Referring now to FIG. 4, a microcontroller having the invented register file is shown connected to an external device such as a scanner, copier, point of sale terminal, CD-ROM drive, tape drive, telephone switch or the like having a memory 61 connected to the microcontroller bus interface 29 and external device controller 63 coupled to the microcontroller peripheral interface. The specifics of these connections are highly device dependent, are well known to persons skilled in the art and are not needed for an understanding of the invention. In the configuration shown in FIG. 4, a complete system for performing a particular device dependent function is provided.

The specifics of the implementation details set forth herein are provided by way of example only to illustrate the concepts forming the invention and should not be construed as limiting the scope of the invention since other microcontroller or microprocessor architectures may utilize an entirely different implementation. However, the various changes which would be needed to implement the invention for other architectures should be readily apparent to persons skilled in the art.

I claim:

1. A register file within a central processing unit of a microcontroller or a microprocessor comprising:

a) a plurality of registers each having a predetermined length which is the same for each of said registers;

b) means for addressing said registers using a register addressing mode wherein said register addressing mode addresses predetermined ones of said registers as byte registers, predetermined pairs of said registers as word registers and predetermined fours of said registers as double word registers wherein said addressing means includes:

decode logic means for receiving information concerning the instruction to be executed to determine whether the operand of the instruction is of byte length, word length or double word length and generating a signal accordingly;

means for modifying a register address as encoded in the instruction being executed to convert it from an address having a first length to an address having a second length, wherein said first length is shorter than said second length and wherein said modification is different for byte register addresses, word register addresses and double word addresses in that bits added to said address having said second length are added to a different portion of said address having said second length as a function of whether said address is a byte register address, word register address or double word address;

means coupled to said decode logic means for passing a predetermined one of said modified register addresses based on the length of the operand of the instruction being executed as an address to said register file.

2. The register file defined by claim 1 wherein said means for addressing addresses:

a first set of predetermined ones of said registers as byte registers, word registers and double word registers;

a second set of predetermined ones of said registers as word registers and double word registers and not as byte registers; and a third set of predetermined ones of said registers as double word registers, and not as word registers and not as byte registers.

3. The register file defined by claim 1 wherein the number of said registers addressable as byte registers, word registers and double word registers are equal.

4. The register file defined by claim 1 wherein said means coupled to said decode logic means is a multiplexor.

5. The register file defined by claim 1 wherein said first length is a four bit address and said second length is a six bit address.

6. The register file defined by claim 1 wherein said addressing means further comprises:

means for generating a signal specifying for word and double word operations which register within a register pair or group of four registers is to be written to or read from during a current clock cycle.

7. The register file defined by claim 6 wherein said addressing means further comprises:

an OR gate coupled to said signal generating means and a predetermined number of low order bits from said register address modifying means, the output of said OR gate being combined with a predetermined number of high order from said register address modifying means forming an address for addressing a desired register within said register file.

8. The register file defined by claim 7 wherein said predetermined number of low order bits is two and said predetermined number of high order bits is four, thereby forming a six bit address.

9. A system for controlling a device comprising:
   a) at least one storage means;
   b) a microcontroller including a central processing unit coupled to said storage means, said at least one storage means for storing a program adapted to control the operation of said microcontroller, said central processing unit having:
      i) a plurality of registers each having a predetermined length which is the same for each of said registers;
      ii) means for addressing said registers using a register addressing mode wherein said register addressing addresses predetermined ones of said registers as byte registers, word registers and double word registers;
   wherein said addressing means includes:
      decode logic means for receiving information concerning the instruction to be executed to determine whether the operand of the instruction is of byte length, word length or double word length and generating a signal accordingly:
      means for modifying a register address as encoded in the instruction being executed to convert it from an address having a first length to an address having a second length, wherein said first length is shorter than said second length and wherein said modification is different for byte register addresses, word register addresses and double word addresses in that bits added to form said address having said second length are added to a different portion of said address having said second length as a function of whether said address is a byte register address, word register address or double word address;
      means coupled to said decode logic means for passing a predetermined one of said modified register addresses based on the length of the operand of the instruction being executed as an address to said register file
   c) said device having a device memory coupled to a bus interface of said microcontroller and a device controller coupled to a peripheral interface of said microcontroller.

10. The system defined by claim 9 wherein said means for addressing addresses:
   a first set of predetermined ones of said registers as byte registers, word registers and double word registers;
   a second set of predetermined ones of said registers as word registers and double word registers and not as byte registers; and
   a third set of predetermined ones of said registers as double word registers, and not as word registers and not as byte registers.

11. The register file defined by claim 9 wherein the number of said registers addressable as byte registers, word registers and double word registers are equal.

12. A register file within a central processing unit of a microcontroller or a microprocessor comprising:
   a) a plurality of registers each having a predetermined length which is the same for each of said registers;
   b) means for addressing said registers using a register addressing mode wherein said register addressing mode addresses predetermined ones of said registers as registers having a first length, predetermined pairs of said registers as registers having a second length and predetermined fours of said registers as registers having a third length, wherein said third length is greater than said second length and said second length is greater than said first length wherein said addressing means includes:
      decode logic means for receiving information concerning the instruction to be executed to determine whether the operand of the instruction is of said first length, said second length or said third length and generating a signal accordingly;
      means for modifying a register address as encoded in the instruction being executed to convert it from an address having a fourth length to an address having a fifth length, wherein said fourth length is shorter than said fifth length and wherein said modification is different for addresses of said first length, said second length and said third length in that bits added to form said address having said fourth length are added to a different portion of said address having said fourth length as a function of whether said address is a first length address, second length address or third length address;
      means coupled to said decode logic means for passing a predetermined one of said modified register addresses based on the length of the operand of the instruction being executed as an address to said register file.

* * * * *